Sept. 16, 1969  D. E. BROUSSARD ETAL  3,466,882
OFFSHORE INSTALLATION AND METHOD OF INSTALLING A PIPE RISER
Filed May 29, 1967  7 Sheets-Sheet 1

INVENTORS:
DOUGLAS E. BROUSSARD
DEAN P. HEMPHILL
BY: A. H. McCarthy
THEIR AGENT

INVENTORS:
DOUGLAS E. BROUSSARD
DEAN P. HEMPHILL
BY: A. H. McCarthy
THEIR AGENT

Sept. 16, 1969  D. E. BROUSSARD ET AL  3,466,882
OFFSHORE INSTALLATION AND METHOD OF INSTALLING A PIPE RISER
Filed May 29, 1967  7 Sheets-Sheet 3

INVENTORS:
DOUGLAS E. BROUSSARD
DEAN P. HEMPHILL
BY: J. H. McCarthy
THEIR AGENT

INVENTORS:
DOUGLAS E. BROUSSARD
DEAN P. HEMPHILL
BY: J. H. McCarthy
THEIR AGENT

United States Patent Office 3,466,882
Patented Sept. 16, 1969

3,466,882
OFFSHORE INSTALLATION AND METHOD OF INSTALLING A PIPE RISER
Douglas E. Broussard and Dean P. Hemphill, Houston, Tex., assignors to Shell Oil Company, New York, N.Y., a corporation of Delaware
Filed May 29, 1967, Ser. No. 641,961
Int. Cl. F16l 1/00; E02b 17/00
U.S. Cl. 61—72.3                    23 Claims

ABSTRACT OF THE DISCLOSURE

A method and apparatus for connecting an underwater pipeline lying along the floor of a body of water to an offshore platform in which the end of the pipeline is bent upwardly to form a pipeline "rise" and subsequently connected to the platform. The pipeline is bent to a desired curvature having a sufficient radius to prevent buckling the pipeline.

---

This invention relates to underwater flow lines and more particularly to a method and apparatus for connecting an underwater flow line to an offshore "platform."

The development of offshore oil and gas wells frequently necessitates the use of offshore installations or so-called "platforms." These installations are used, for example, for drilling and subsequently for producing a well or wells. Accordingly, it is often desirable to provide one or more flow lines from a platform to a remote point, for example, to shore or to another platform. The flow lines may serve many purposes, the most common being to carry off the output of oil or gas from a well. Since the flow line (also referred to herein as pipeline) lays in a substantially horizontal position along the floor of the body of water in which the platform is located, a problem arises in establishing fluid communication between the flow line and the surface of the platform which is above the surface of the body of water. It will be thus apparent that either the flow line must be bent from its horizontal position on the ocean floor to a vertical position extending to the upper surface of the platform or a separate vertical extension must be installed and connected to the flow line on the ocean floor. The vertical portion is generally referred to as the flow line "riser."

The present practice for installing the "riser" is to provide a vertical flow line or pipeline segment along the side of the platform which extends to the floor of the body of water and is connected to the underwater flow line by divers. However, this is a generally cumbersome and expensive operation, particularly in relatively deep water where the divers' effectiveness is severely impaired.

At greater than diver depths, connections cannot be made by divers on the ocean floor. In this case, it is known to first connect the "riser" to the flowline and lower the assembly down a leg of the platform while simultaneously laying the flow line from a barge proceeding away from the platform. However, the procedure also has drawbacks in that the lowering and laying operation must be carefully programmed to prevent damage to the pipeline and/or riser. In addition, the method is only applicable where a pipeline is laid away from a platform and cannot be readily and easily employed where a pipeline approaches a platform.

In view of the problems encountered with conventional riser installations, it is a primary object of this invention to provide a method of installing a flow line riser to an offshore platform which eliminates the need for making an underwater connection.

Another object is to install a flow line riser to a platform in which the flow line may be laid either toward or away from the platform.

A further object is to provide a method of installing a riser in which the underwater flow line and the riser may be formed of one continuous pipeline.

A still further object is to bend the underwater flow line to provide an upstanding portion which serves as a riser.

And yet a further object is to bend the flow line to form a riser while maintaining the radius of curvature above a predetermined minimum so as to prevent buckling of the pipeline.

Still another object is to provide an offshore platform with a flow line adapted to lay along the floor of a body of water and bent to a desired curvature to form a riser extending to said platform.

These and other objects will be apparent from the reading of the following detailed description taken in conjunction with the accompanying drawings in which:

FIGURES 1 through 5 show one embodiment of the invention.

Figure 1:
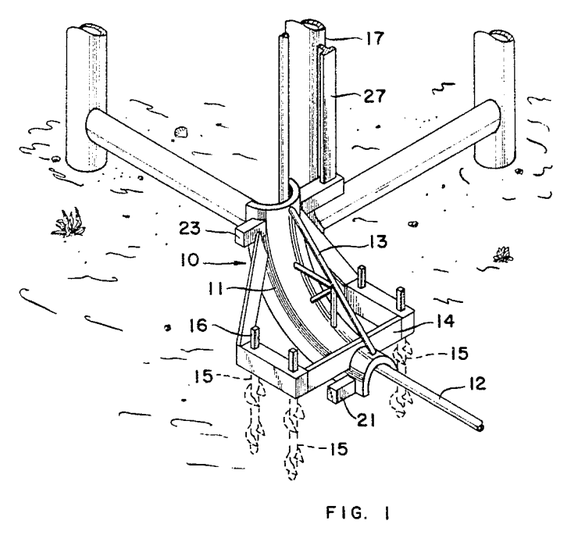
FIGURE 1 is a perspective view of the substructure of an offshore platform with a flow line riser in place.

Referring now to FIGURE 1, the device is shown with a pipeline installed and is indicated generally by the numeral 10. The bending guide or "shoe" 10 includes a curvature limiting fixture 11 in the form of half of a tubular segment split longitudinally and bent approximately 90° to form a cradle for receiving a pipeline 12. Suitable bracing 13 may be employed along the back of the fixture to prevent the device from bending during operation. Also included in the bending guide and connected to the curvature limiting fixture 11 is an anchoring assembly 14 having downwardly depending augers 15 which are adapted to be driven into the floor of the body of water to fixedly secure the bending guide 10 to the floor of a body of water. The means for driving the augers 15 may take any suitable form and may be operated remotely from the surface of the water or by divers. As shown, drive shafts 16, which are drivably connected to the augers 15, may be driven with a suitable power head (not shown) and may be manipulated by divers into position or lowered from the surface onto the drive shafts 16 and then actuated either electrically, manually or hydraulically to drive the augers and anchor the bending shoe 10. After anchoring, the power head may be disconnected and removed to the surface.

Although one preferred form of anchoring is shown, it will be readily apparent that the device may be suitably anchored into place in another manner. For example, it may be attached directly to the platform 17 or other forms of anchoring to the floor of the body of water may be employed. For example, inverted cup-shaped members may be substituted for the augers 15. By evacuating the interior of the cup-shaped members they will be anchored to the sea floor by virtue of the suction created.

Figure 2:
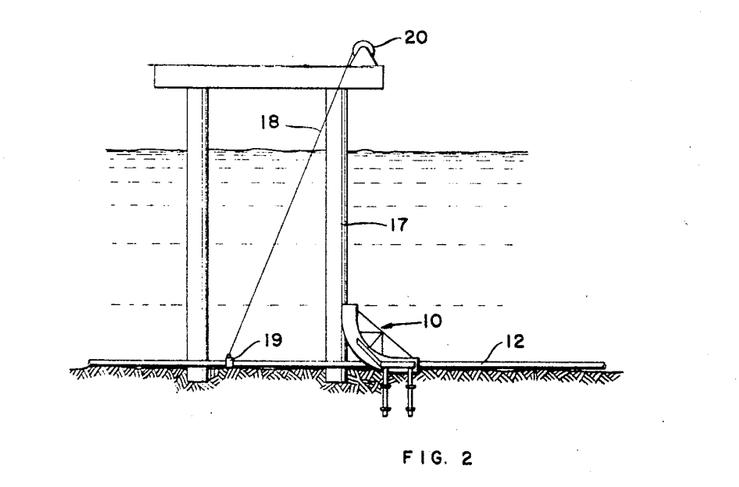
FIGURE 2 is an elevation view of the platform showing an underwater flow line prior to being bent around a bending guide to form a riser.
Figure 3:
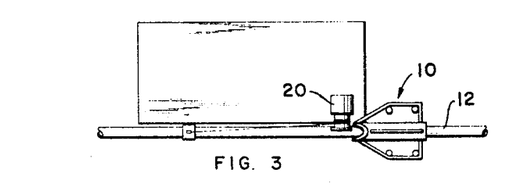
FIGURE 3 is a plan view of FIGURE 2.

Referring now to FIGURES 2 through 5, the sequence of installing the pipeline 12 is disclosed. Referring to FIGURES 2 and 3, the pipeline 12 is shown installed adjacent the platform 11 having been so positioned from a suitable pipe laying barge (not shown) prior to installing the guide 10. After the pipeline has been laid, drawline 18 is suitably secured to the pipeline by a clamp 19. The drawline extends to the platform surface where it is attached to a suitable hoisting mechanism, for example, a winch 20. The pipe guide 10 is then lowered into position over the pipeline 12 where it is suitably anchored so that the lower portion of the curvature limiting fixture 11 is cradled over the pipeline 12. The guide 10 may be positioned by divers operating on the sea floor, by guide lines, or by lowering the guide down a leg of the platform 17 along a rail 27 secured to the platform leg 17. While not essential to the invention, it is preferable to employ latch means 21 as shown in FIGURE 1 at the lower end of the curvature limiting fixture 11 to positively hold the pipeline 12 in the curvature limting fixture 11. The latch 21 may be self-actuating, that is, it may be tripped by the pipeline 12 or it may be remotely operated by a mechanical underwater manipulator or operated by divers after the bending shoe is in place.

After the bending shoe is positioned, which 20 is actuated to hoist drawline 18 thereby lifting the pipeline 12 into contact with the bending guide 10. The curavture limiting fixture acts as a fulcrum for the pipeline 12 and the pipeline will conform to and bend around the curvature limiting fixture. Therefore, it will be apparent that the curvature limiting guide 11 will dictate the radius of curvature of the pipeline 12 and thus it should have a sufficient radius of curvature to prevent the pipeline from collapsing or buckling. The minimum radius of curvature will, of course, vary dependent on the size and type of pipe used to make up flow line 12.

Figure 4:
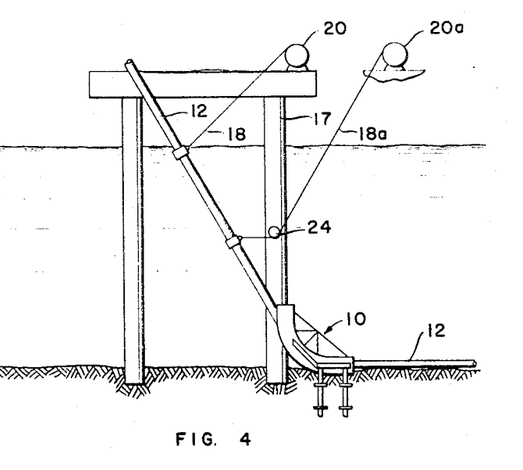
FIGURE 4 is an elevational view similar to FIGURE 3 showing a flow line being bent into place to form a riser.
Figure 5:
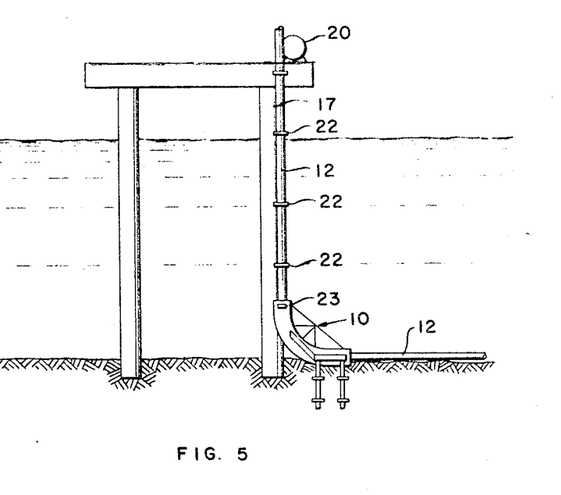
FIGURE 5 is an elevational view showing the flow line in its final installed position.

The pipeline 12 is hoisted by means of drawline 18 as shown in FIGURE 4 until it reaches a nearly vertical position as shown in FIGURE 5. When the final position of the pipeline is reached, it is attached to the platform 11 by means of clamps 22 located at conveniently spaced points along the platform structure. In addition, it is preferable to employ a latch 23 near the upper end of the bending guide as best shown in FIGURE 1. The construction and operation of this latch is similar to that of latch 21 as discussed above.

It may be necessary in some cases, where the length of pipe extending beyond the bending guide 10 (i.e., the unsupported portion being hoisted) is great enough, to employ an additional drawline 18a to assist in hoisting pipeline 12 into position (see FIGURE 4). The additional draw line is driven by a hoist 20a and is preferably pulled about a pulley 24 secured to platform leg 17 of the platform to keep the pulling force more perpendicular to the pipeline. When an additional hoisting draw line is employed, draw line 18 will be secured to the pipeline 12 nearer the end of the pipeline so that the lifting force is more evenly distributed along the pipeline.

The vertical or "riser" portion of the pipeline 12 extending to the upper surface of the platform 11 may be connected to processing equipment handling the output of a well drilled through one of the legs of the platform (not shown) or may be connected directly to a well or to another pipeline leading to the platform. Although the "riser" is shown in a vertical position, it should be understood that the riser may be installed at any angle from the horizontal without departing from the spirit of the invention. For example, the flow line could be bent to a 45° angle and then joined with another section to provide communication with the upper surface of the platform 11. In addition, the riser need not extend to the surface. It may, for example, extend only a short distance past the upper end of the pipe bending guide 10. Pipe lengths could subsequently be added to the end of the pipeline 12 to form a riser extending to the surface of the platform.

Other modifications of the invention are shown in FIGURES 6 through 9.

Figure 6:
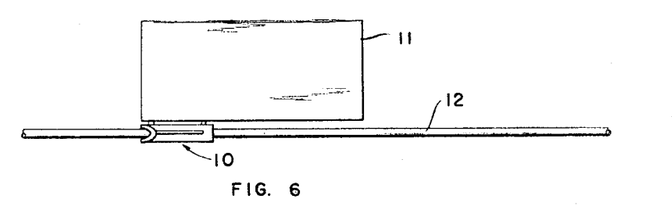
FIGURE 6 is a plan view showing one modification of the subject invention in which a flow line is bent to form a riser at the opposite end of the platform.

FIGURE 6 is a plan view of the platform 11 showing the pipe bending guide 10 positioned at the opposite end of the platform. In this arrangement the pipe bending guide 10 is attached directly to the substructure of the platform rather than being anchored to the sea floor as in the preferred embodiment shown in FIGURES 1 through 5. Any suitable means of attaching the pipe bending guide 10 to the substructure of the platform may be employed. For example, it may be slid down suitable rails attached to the platform leg (not shown) or it could be positioned and secured by divers operating on the ocean floor.

Figure 7:
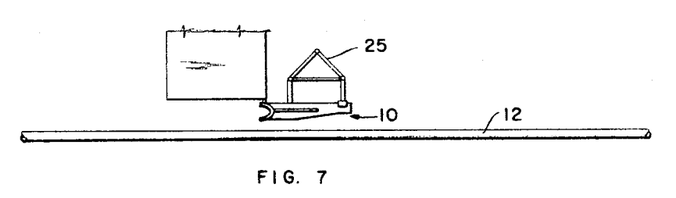
FIGURE 7 is another modification which shows a bending guide which may be installed prior to positioning the underwater flow line.
Figure 8:
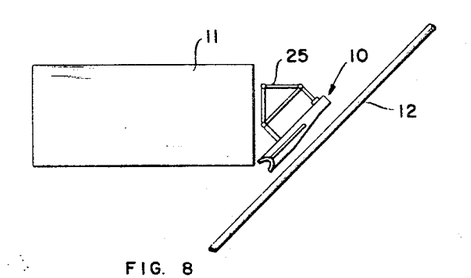
FIGURE 8 is another modification similar to the modification shown in FIGURE 7 in which the underwater flow line is at an angle with respect to the platform.
Figure 9:
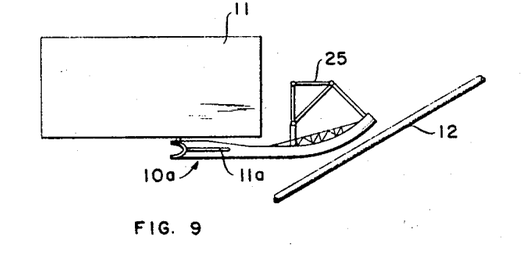
FIGURE 9 is another modification in which the underwater flowline is first bent in the horizontal plane to align it parallel with the platform prior to bending it vertically to form a riser.

In the modifications shown in FIGURES 7, 8 and 9, anchoring means 25 are employed and are positioned entirely to one side of the guide 10. These arrangements leave the side opposite the anchoring means open to receive a pipeline which may be moved laterally or slid under the bending guide 10. For example, as shown in FIGURE 7, pipe bending guide 10 could be positioned and suitably anchored prior to receiving pipeline 12. After the guide is in place, pipeline 12 may be laid alongside the guide as shown in FIGURE 7 and then moved laterally toward the guide so that it assumes a position directly underneath the bending guide 10. After the pipeline is so positioned, the sequence of operations for bending the pipeline 12 about the guide are the same as that described above in reference to the preferred embodiment. FIGURE 8 shows a pipe bending guide positioned at an angle with respect to the platform in order to accommodate a pipeline laid alongside the platform at approximately a 45° angle. It will be thus apparent that the position of the guide may be varied in order to accommodate the particular angle the pipeline assumes relative to platform 10. FIGURE 9 shows a somewhat different form of pipe bending guide 10a including an extension 26 curved in the horizontal plane in order to reorient the pipeline from an angular to a parallel disposition with respect to the platform 11. As shown, the pipeline 12 is moved toward the bending guide 10a where it first contacts the curved extension 26. Continued movement causes the pipeline to conform to the curvature of the extension, thus placing the pipeline directly under the curvature limiting fixture portion 11a which is the same as the curvature limiting fixture shown in FIGURE 1. The pipeline is then hoisted upward to conform to the curvature limiting fixture in a manner as described above.

Figure 10:
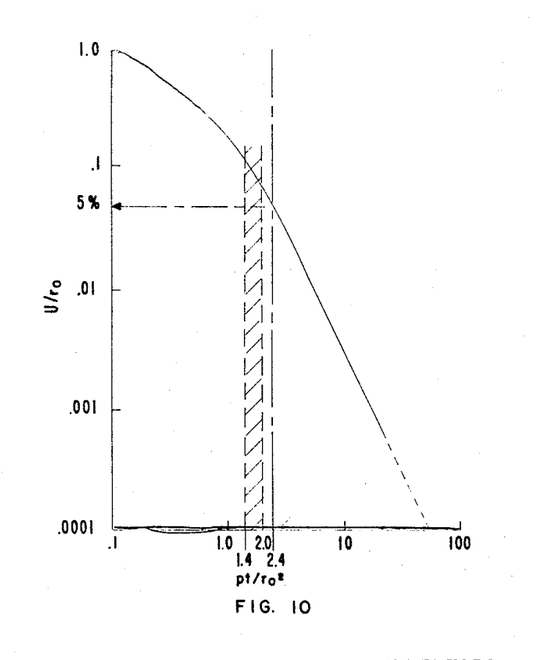
FIGURES 10–14 are graphs depicting the behavior of the pipeline during bending and moments developed in foot-pounds.

As an example of how the method can be applied, assume a 20-inch by 0.500-inch wall pipe which is to be connected to a platform in which the height of the riser will be 200 feet. FIGURE 10, which shows a plot of pipe flattening as a function of the curvature and pipe geometry, indicates that this pipe can be bent to a radius of curvature of approximately 33 feet $$\left(2\frac{r_o^2}{t}\right)$$

before buckling. This dimensionless plot was made from the results obtained from numerous tests in which pipes of various grades and radius to thickness ratios were loaded in pure bending. It shows the flattening of the pipe (the change in radius of the pipe divided by the original outside radius) as a function of the radius of curvature to which the pipe is bent ($p$) multiplied by the pipe wall thickness over the original outside radius squared ($t/r_o^2$). The pipe to be bent around the shoe also has some axial loading, which tends to increase the flattening. However, the axial loading effect is small at the axial load magnitudes expected with this method, and can be neglected since a factor for safety is included in designing the curvature of the shoe.

The buckling curvature of a pipe is somewhat dependent on the amount of strain hardening the pipe material possesses; however, during the pure bending tests the pipe was observed to reach its maximum moment resistance at a value of radius of curvature of approximately $$2\frac{r_o^2}{t}$$

The radius of curvature of the bending shoe 10 must be greater than this minimum value to prevent buckling. For example let the radius of curvature of the shoe be 40 feet.

Figure 11:
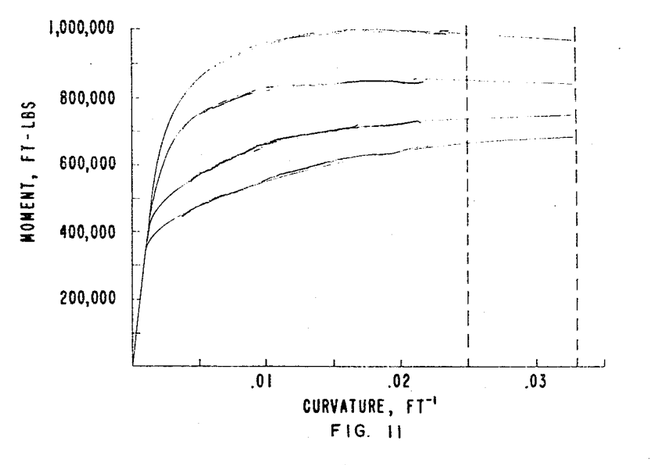

FIGURE 11 shows a plot of moment versus curvature for 20-inch x 0.500-inch pipe of various yield strengths. Assuming the pipe to be bent has a yield stress of 42,000 lbs./in.$^2$, the moment required to bend the pipe to the curvature of the shoe will be approximately 750,000 ft./lb. With a bending shoe as shown in FIGURE 10, at least 250 feet of pipe is positioned past the clamp and under the shoe.

Figure 12:
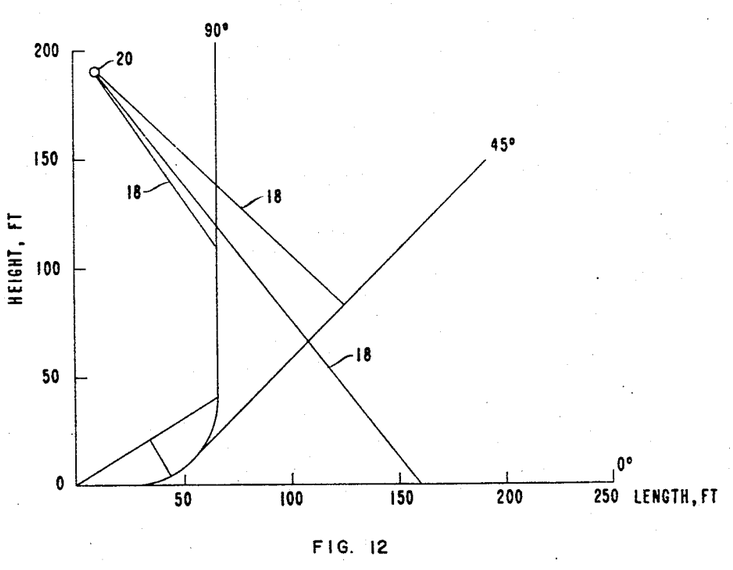

With one end of a drawline 18 going to a winch 20 positioned as shown in FIGURE 12, the other end of the cable can be attached at some point along the pipe. If the cable is attached at a point near the bending shoe, the moment arm is short and a large pulling force is required. However, if the cable is attached near the end of the pipe the axial component of the pulling force loads the pipe in compression and there is a danger of buckling the pipe. Therefore, the cable is attached at some point which is a compromise between the pulling force required and the danger of buckling the pipe. Of course, this problem can be reduced by using multiple cables and pulleys as mentioned above to keep the pulling force perpendicular to the axis of the pipe. For this example only one cable will be used.

The approximate pulling force required with one cable can be calculated with the equation:

$$F \cong \frac{M_p + \frac{wl^2}{2}\cos \Phi}{x \cos (\theta + \Phi - 90)}$$

where:
F=pulling force in pounds.
$M_p$=plastic moment required to bend pipe to curvature of the shoe (ft.-lbs.).
w=weight per foot of the pipe and coating in water (lbs./ft.).
l=length of pipe from point at which it contacts the shoe (ft.).
x=moment arm (distance from point at which pipe contacts shoe to the point where the pulling force is applied) (ft.).

$\Phi$=angle between pipe and horizontal.
$\theta$=angle between cable and horizontal.

With the cable attached 160 feet from the clamp, the pulling force can be calculated with the pipe in various stages of bending. For example, with the pipe at 0°, 45° and 90° as shown in FIGURE 12, the pulling forces are 12,500 lbs., 9,000 lbs. and 18,000 lbs.

Figure 13:
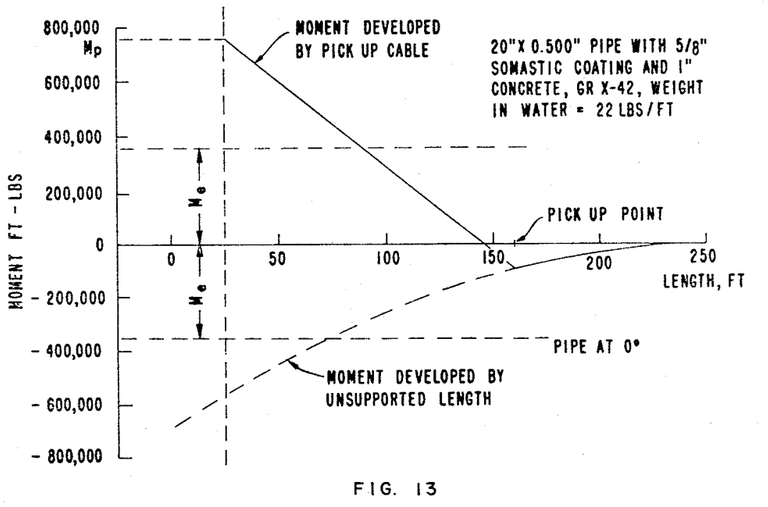
Figure 14:
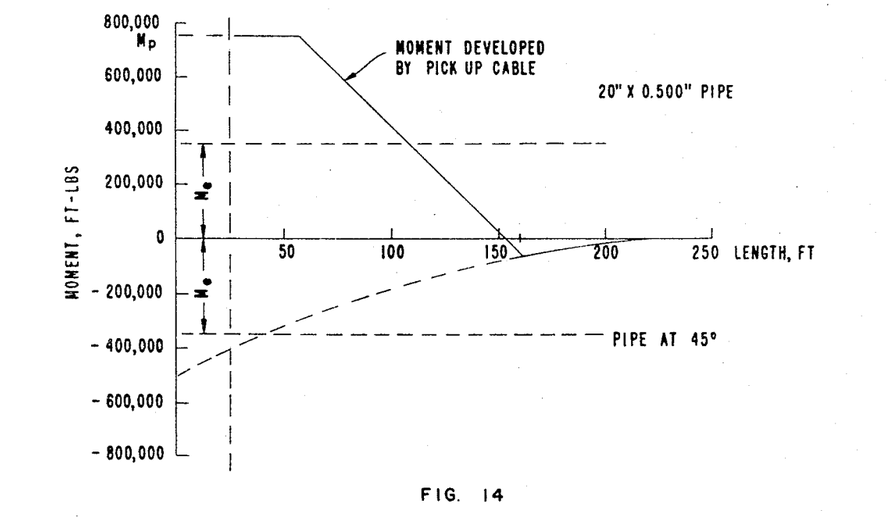
Figure 15:
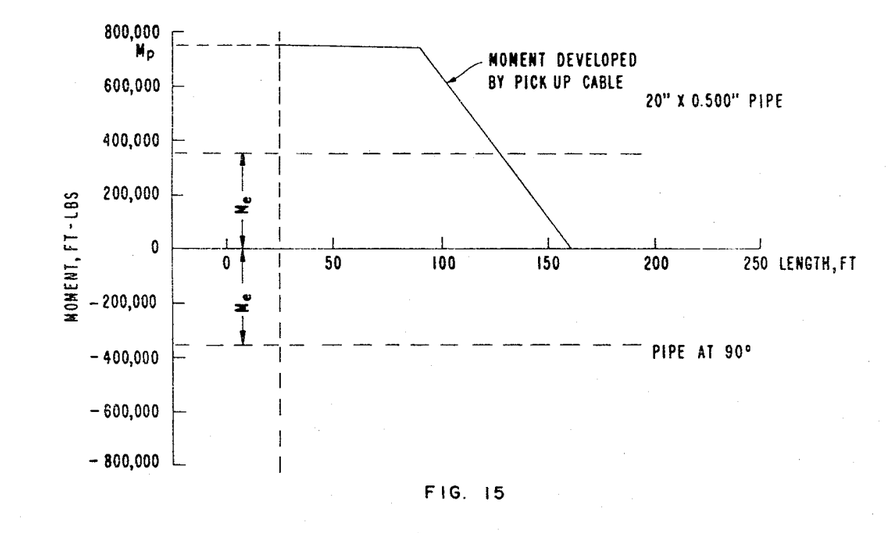

The corresponding moment distribution plots for the pipe in each of these positions are shown in FIGURES 13, 14 and 15. There is a negative moment in the pipe where the cable is attached caused by the unsupported length of pipe beyond the pickup point. However, as long as this moment is less than the maximum elastic moment of the pipe, no permanent bending will occur due to the unsupported length. The moment is a maximum where the pipe contacts the bending shoe, and a moment must be developed equal to the moment required to bend the pipe to the curvature of the shoe (750,000 ft.-lbs. in this example). FIGURES 13–15 show that essentially all the plastic deformation occurs in the pipe which is eventually bent into the shoe. When the pipe reaches the desired position, it is clamped at the top of the shoe (clamp 23, FIGURE 1) and at intervals along the platform legs or bracing (clamps 22). The riser installation is then complete.

A one-tenth scale model has been used in investigating the bending shoe concept. The model tests worked as predicted. Both the measured values of the flattening of the pipe cross section and the forces required agreed closely with the values predicted by the analytical methods shown in the example.

Figure 16:
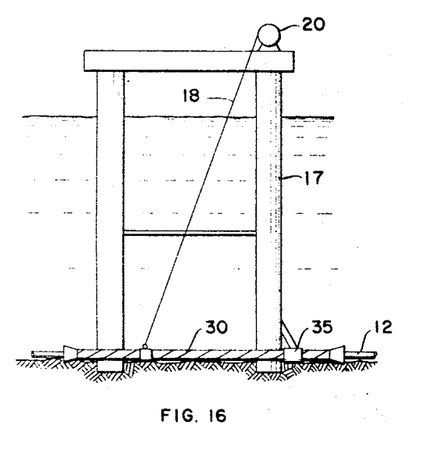
FIGURE 16 is an elevational view of a platform disclosing a modified form of the invention employing a slotted bending guide.
Figure 17:
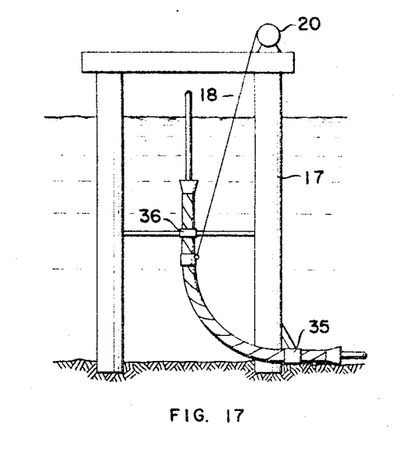
FIGURE 17 is the same elevational view with a flow line bent into place to form a riser.
Figure 18:
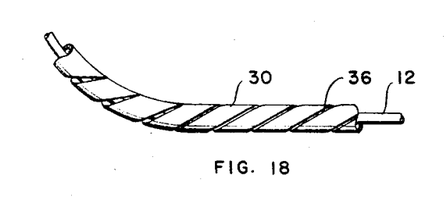
FIGURE 18 is a partial detail of the bending guide employed in FIGURES 16 and 17.

An alternative bending apparatus is disclosed in FIGURES 16–18. Referring to FIGURE 16 a tubular bending guide sleeve 30 is shown installed on the pipeline 12 in the vicinity of the platform 17. The guide 30 is a tubular sleeve having a flexible portion which is slotted in a helical pattern to permit the guide and pipeline to bend to a desired curvature as shown in detail in FIGURE 18. The helical slot 36 constitutes curvature-limiting means to limit bending to a desired curvature as dictated by the width of the slot. As shown in FIGURE 18, the slot will close as the pipeline 12 and guide sleeve 30 are bent so that each turn of the helical portion of the guide sleeve serves as a stop when it abuts with an adjacent turn to limit further bending at that point. Thus, it will be seen that the width of the slot and the number of turns of the guide sleeve may be varied to regulate the desired amount of bending, i.e., to establish the minimum radius of curvature of the pipeline 12. At least one end of the sleeve may optionally be attached to the pipeline 12 once the sleeve is in position.

A helically slotted sleeve of the type employed is disclosed in the U.S. patent to Zublin, 2,336,334, and a modified form in which the helical coils of the sleeve are interlocked to prevent uncoiling is disclosed in the U.S. patent to Zublin, 2,708,099.

Referring again to FIGURE 16 it will be seen that once the sleeve 30 and pipeline 12 are in place alongside the platform 17, drawline 18 is hoisted by means of a winch 20 or other suitable lifting device. The drawline 18 may be attached to the sleeve 30 either before or after the sleeve is in place as shown in FIGURE 16. It is also preferable although not required that some form of restraint, indicated by numeral 35, be employed to prevent the pipeline and sleeve from lifting off the water floor during bending. The restraining device 35 may be of any suitable design, e.g., a clamp or an inverted U-shaped member, attached to platform 17. It may, of course, also be anchored directly to the water floor in a manner described with reference to the preferred embodiment of FIGURES 1 and 2. Of course, the restraining device 35 is not necessary where the weight of the pipeline 12 is sufficient to prevent the right hand end of the sleeve from lifting off the water floor when drawline 18 is hoisted.

Figure 19:
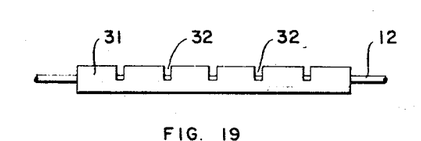
FIGURE 19 is a partial view of a modified slotted bending guide.
Figure 20:
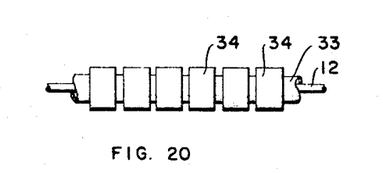
FIGURE 20 is a partial view of another modified bending guide employing spaced rings.

FIGURES 19 and 20 disclose modified forms of the sleeve 30 in which other forms of curvature limiting means are employed along the flexible portion of the sleeve. As shown in FIGURE 19, a modified sleeve 31 includes a flexible portion formed with a series of evenly spaced slots 32 extending approximately half way through the sleeve 31. Thus, as the sleeve 31 bends the slots 32 will close thereby limiting the rodius of curvature of the sleeve and pipeline.

In the modification shown in FIGURE 20, a modified sleeve 33 is disclosed having bands 34 attached around the outer periphery of the sleeve 33 and evenly spaced therealong so that some space is provided between each band 34 to permit the sleeve to bend. As the sleeve 33 bends the bands 34 will abut. Whenever a pair of bands 34 abut further bending at that point is controlled. This process continues during bending until all the bands 34 have abutted thus establishing a smooth continuous controlled radius of curvature of the sleeve 33 and pipeline 12.

Other forms of curvature limiting means will be readily apparent to one skilled in the art without departing from the invention. For example, the ends of slack chain lengths (not shown) could be welded to the lower side of the sleeve. As bending occurs, the chains will tighten to prevent further bending. A desired curvature can be obtained by selectively placing the chains along the flexible portion of the sleeve.

Although the entire length of the bending guide 30 is slotted as shown in FIGURES 16 and 17, it will be apparent that only the flexible portion of the guide where bending is desired need be slotted. Furthermore, the guide may extend all the way to the water surface after it is bent so that a protective sheath for the pipeline 12 is provided. In addition, more than one guideline 18 may be employed at spaced intervals along the guide 30 in order to assure more even bending of the pipeline 12, as for example, a deep water where a long riser requiring a large bend is installed.

We claim as our invention:

1. A method of connecting a flow line having a major portion adapted to lie along the floor of a body of water to an offshore installation of the type having support means positioned on the floor of said body of water and platform means carried by said support means, said method comprising:
   positioning said flow line along the floor of said body of water adjacent said offshore installation;
   terminating said flow line past said installation to thereby form an end of said flow line;
   restraining said flow line from movement in a vertical direction at a fixed distance from the end of said flow line;
   lifting the portion of said flow line extending beyond said point of restraint to thereby cause said flow line to plastically deform as a bend at said point of restraint;
   maintaining the radius of curvature of said bend above a predetermined minimum to prevent buckling of said flow line;
   continuing lifting said flow line until the portion of said flow line extending beyond said point of restraint reaches a selected angle with respect to the floor of said body of water; and
   attaching said portion of flow line extending beyond said point of restraint to said offshore installation.

2. The method according to claim 1 wherein said selected angle with respect to the floor of said body of water is substantially 90°.

3. The method according to claim 1 including the steps of:
   restraining said flowline from movement in a horizontal direction at a distance from the end of said flow line greater than the distance at which said flow line is restrained in a vertical direction; and,
   pulling the portion of said flow line extending beyond said point of horizontal restrain laterally to bend said flow line in a horizontal plane while maintaining the radius of curvature above a predetermined minimum;
   said steps being performed prior to the step of restraining said flow line from movement in a vertical direction.

4. A method of connecting a flow line having a major portion adapted to lie along the floor of a body of water to an offshore installation of the type having support means positioned on the floor of said body of water and method comprising:
   platform means carried by said support means, said positioning said flow line along the floor of said body of water and adjacent said offshore installation;
   terminating said flow line past said installation to thereby form an end of said flow line;
   securing at least one drawline to the portion of said flow line extending past said installation and extending said drawline above the surface of said body of water;
   fixedly positioning against vertical movement a curved bending guide over said flow line at a fixed distance from the end of said flow line;
   hoisting said drawline to raise the portion of said flow line extending past said installation and cause said flowline to conform to and bend about said bending guide;
   continuing said hoisting until said end portion reaches a selected angle with respect to the floor of said body of water; and,
   connecting said end portion to said offshore installation.

5. The method according to claim 4 wherein the step of positioning a curved bending guide over said flow line is performed by attaching said guide to said offshore installation.

6. The method according to claim 4 wherein the step of positioning a curved bending guide over said flow line is performed by anchoring said guide to the floor of said body of water.

7. The method according to claim 4 wherein the step of securing at least one drawline is performed prior to positioning the end portion of said flow line adjacent the offshore platform.

8. The method according to claim 4 wherein said selected angle is substantially 90°.

9. The method according to claim 4 wherein the step of positioning the curved bending guide is performed prior to opsitioning said end portion of said flowline and the step of positioning said end portion comprises:
   positioning said end portion of said flowline along the floor of said body of water adjacent said curved bending guide and extending beyond said guide a fixed distance; and,
   subsequently moving said flow line laterally to a position under said curved bending guide.

10. The method according to claim 4 including the step of latching said flow line to said curved bending guide as said flow line is moved against said guide.

11. An offshore installation positioned on the floor of a body of water and adapted to receive a pipeline having a major portion lying along the floor of said body of water, said installation comprising:
    leg means positioned on the floor of said body of water;
    an operating platform supported on said leg means;
    curved bending guide means fixedly positioned adjacent said leg means near the floor of said body of water and having a curved pipe engaging surface;
    pipeline latching means carried by said bending guide means for latching said pipeline against said pipe engaging surface; and,
    hoist means located on said platform including at least one drawline attachable to said pipeline for pulling said pipeline against said pipe engaging surface to thereby bend said pipe to a predetermined angle with respect to the floor of said body of water.

12. The installation as defined in claim 11 wherein said leg means comprise a plurality of legs.

13. The installation as defined in claim 12 including attaching means for securing said beinding guide means to one of said legs.

14. The installation as defined in claim 11 including anchoring means carried by said bending guide means for anchoring said guide means to the floor of said body of water.

15. The installation as defined in claim 11 including guide rail means mounted on said leg means and rail carriage means mounted on said bending guide means, said carriage means slidably carried by said rail means for sliding said bending guide means down said leg means to a preselected position near the floor of said body of water.

16. An offshore installation positioned on the floor of a body of water and adapted to receive a pipeline having a major portion lying along the floor of a body of water, said installation comprising:
   leg means positioned on the floor of said body of water;
   an operating platform supported on said leg means;
   a tubular bending guide sleeve adapted to be positioned around said pipeline along the floor of said body of water adjacent said leg means, said sleeve having a flexible portion to permit said sleeve and pipeline to bend to a desired curvature along said flexible portion; and,
   hoist means carried by said platform including at least one drawline attachable to said sleeve near one end of said sleeve portion for lifting said sleeve to thereby cause said flexible portion to bend to said desired curvature in a substantially vertical plane.

17. The installation as defined in claim 16 including attaching means for attaching said sleeve and flow line to said installation.

18. An offshore installation positioned on the floor of a body of water and adapted to receive a pipeline having a major portion lying along the floor of a body of water, said installation comprising:
   leg means positioned on the floor of said body of water;
   an operating platform supported on said leg means;
   a tubular bending guide sleeve adapted to be positioned around said pipeline and having a portion of greater flexibility intermediate the ends thereof to permit said sleeve and pipeline to bend to a desired curvature along said flexible portion;
   said flexible portion including curvature-limiting means to limit the radius of curvature of said flexible portion to said desired curvature; and
   hoist means positioned on said platform including at least one drawline extendable down through said water adjacent said offshore platform near one end of said flexible portion for lifting said sleeve and pipeline contained therein to thereby cause said flexible portion and pipeline to bend to said desired curvature in a substantially vertical plane.

19. An installation as defined in claim 18 including attaching means for attaching said sleeve and pipeline to said installation.

20. An installation as defined in claim 18 including restraining means carried by said leg means and positioned to engage said sleeve at the end of the flexible section opposite the end to which said drawline is attached to thereby restrain said sleeve from moving upwardly in the vicinity of said restaining means.

21. An installation as defined in claim 20 wherein said curvature-limiting means comprise a generally helical slot formed at least along said flexible portion of said sleeve.

22. An installation as defined in claim 20 wherein said curvature-limiting means comprise a series of spaced transverse slots formed in the upper side of said sleeve at least along said flexible portion.

23. An installation as defined in claim 20 wherein said curvature-limiting means comprise a series of spaced bands attached about the outer periphery of said sleeve at least along said flexible portion.

References Cited

UNITED STATES PATENTS

| | | | |
|---|---|---|---|
| 1,152,326 | 8/1915 | Lewis | 61—72.3 X |
| 3,072,268 | 1/1963 | Purtell | 61—72.1 X |
| 3,214,921 | 11/1965 | Goepfert et al. | 61—72.3 |
| 3,219,119 | 11/1965 | Matthews | 61—72.3 X |
| 3,226,728 | 12/1965 | Walvoord | 61—72.3 X |
| 3,258,928 | 7/1966 | Broadway et al. | 61—72.3 |
| 3,273,346 | 9/1966 | Delaruelle et al. | 61—72.3 |
| 3,298,092 | 1/1967 | Dozier et al. | 61—72.3 X |
| 3,373,570 | 3/1968 | Hindman | 61—72.3 |
| 3,376,708 | 4/1968 | Hindman | 61—72.3 |

EARL J. WITMER, Primary Examiner

PO-1050
(5/69)

UNITED STATES PATENT OFFICE
CERTIFICATE OF CORRECTION

Patent No. 3466882      Dated September 16, 1969

Inventor(s) Douglas E. Broussard et al

It is certified that error appears in the above-identified patent and that said Letters Patent are hereby corrected as shown below:

Column 1, line 16, "rise" should read -- riser --. Column 2, line 46, "10-14" should read -- 10-15 --. Column 3, line 42, "limting" should read -- limiting --; line 47, "which" should read -- winch --. Column 5, line 19, "the", first occurrence, should read -- this --; line 34, after "For", -- this -- should be inserted. Column 7, line 8, "rodius" should read -- radius --; line 37, "a" should read -- in --. Column 8, line 2, "restrain" should read -- restraint --; lines 13 and 14, cancel "method ... means, said" and insert -- platform means carried by said support means, said method comprising: --; line 50, "opsitioning" should read -- position Column 9, line 6, "beinding" should read -- bending --. Column 10, line 21, "restaining" should read -- restraining --.

SIGNED AND
SEALED
JUN 23 1970

(SEAL)
Attest:

Edward M. Fletcher, Jr.
Attesting Officer

WILLIAM E. SCHUYLER, JR.
Commissioner of Patents